United States Patent [19]

Watanabe et al.

[11] Patent Number: 4,544,931

[45] Date of Patent: Oct. 1, 1985

[54] LIQUID JET RECORDING APPARATUS

[75] Inventors: Yoshitaka Watanabe, Tokyo; Takashi Endo, Machida, both of Japan

[73] Assignee: Canon Kabushiki Kaisha, Tokyo, Japan

[21] Appl. No.: 600,397

[22] Filed: Apr. 16, 1984

[51] Int. Cl.[4] .......... G01D 15/18

[52] U.S. Cl. .......... 346/140 R; 346/140 A

[58] Field of Search .......... 346/140 PD, 140 IJ, 346/75

[56] References Cited

U.S. PATENT DOCUMENTS

| | | | |
|---|---|---|---|
| 4,125,845 | 11/1978 | Stevenson, Jr. | 346/140 PD |
| 4,250,512 | 2/1981 | Kattner et al. | 346/140 PD |
| 4,275,402 | 6/1981 | Kern | 346/140 PD |
| 4,388,630 | 6/1983 | Osaki et al. | 346/75 X |

*Primary Examiner*—George H. Miller, Jr.

*Attorney, Agent, or Firm*—Fitzpatrick, Cella, Harper & Scinto

[57] ABSTRACT

There is provided a liquid jet recording apparatus using recording liquids having viscosities depending upon an ambient temperature. This apparatus comprises: at least one liquid droplet jet head for emitting at least one recording liquid droplet each time the head is driven; drive means for repeatedly driving this head; and control means for controlling the frequency of the repetitive driving of the head by the driving means in accordance with the ambient temperature.

18 Claims, 8 Drawing Figures

LIQUID JET RECORDING APPARATUS

BACKGROUND OF THE INVENTION

1. Field of the Invention

The present invention relates to an apparatus for recording by jetting a liquid for the recording such as an ink jet recording apparatus and, more particularly, to a liquid jet recording apparatus using a liquid for the recording such that a physical property value of its viscosity or the like varies in dependence upon ambient temperature.

2. Description of the Prior Art

Ink jet recording apparatus have advantages such that the direct recording is possible and the recording can be easily done using color inks and the recording can be performed without noise, and the like; therefore, they are being highlighted as new recording technology. Particularly, an ink jet recording apparatus of the on-demand system is becoming a principal technology among full color printer technologies that are recently highlighted from a viewpoint of its low cost and small dimensions.

On the other hand, physical property values of the viscosity and the like of the inks which are used as the recording liquids in these ink jet recording apparatuses easily vary in dependence upon ambient temperature. Therefore, when the physical property values of the recording inks change depending upon ambient temperature in this way, the ink emitting characteristics vary, so that this requires means for the temperature compensation of some types to preferably keep the recording quality irrespective of a change in ambient temperature.

For example, as will be described in detail hereinlater, in an ink jet recording apparatus of the on-demand system using, as an energy source for ink emission, a piezo transducer (hereinbelow, referred to as a piezo element) serving as an example of electrical-mechanical converting elements, it is necessary to refill the ink for the next emission in the head portion of the ink jet head, i.e., in the ink emitting orifice portion for the interval from the time when a necessary quantity of ink has been once emitted to the time when a next necessary quantity of ink is again emitted, and it takes a certain time (refilling time) to refill this ink. Consequently, to perform the recording without using the recording quality to deteriorate, it is necessary to set the time interval of the ink emission due to the driving of such a piezo element to be not shorter than this ink refilling time. Namely, otherwise the ink would have been emitted before a necessary quantity of ink is refilled in the ink emitting orifice portion, so that a quantity of ink to be emitted becomes less than a necessary quantity. Therefore, this invites undesirable situations such as deterioration of recording quality and non-emission of inks.

The refilling time of ink mentioned above depends upon the physical property values of viscosity and the like of inks and as the viscosity of ink increases, the time needed to refill becomes longer. On the other hand, the viscosity of ink depends upon ambient temperature and as the temperature is lower, there is a tendency such that the viscosity becomes larger. Therefore, the lower the ambient temperature is, the longer the time required to refill becomes.

Therefore, to always assure the good recording with high quality irrespective of a change in ambient temperature, for example, there has been considered a method whereby the recording speed to be determined by the ink emitting frequency which is a reciprocal number of the ink emitting time interval is preset in accordance with the ink refilling time under the lowest temperature to be presumed, or means for temperature compensation for keeping the ink temperature at constant by a heating apparatus such as a heater or the like. However, in the former method, since the recording speed has been unconditionally determined so that the recording apparatus is fitted for use under the lowest temperature to be presumed, this causes an inconvenience such that the recording time becomes unnecessarily longer when the recording apparatus is used under the conditions at ordinary to high temperatures. On one hand, in the latter method, there occurs an inconvenience such that the addition of a heating apparatus causes the recording apparatus to become large and the price to be raised.

SUMMARY OF THE INVENTION

The present invention was made in consideration of such circumstances and it is a main object of the invention to provide a novel liquid jet recording apparatus which can solve such inconveniences as mentioned above as a liquid jet recording apparatus for recording by jetting recording liquids whose physical property values vary in dependence upon ambient temperature.

Another object of the present invention is to provide a novel liquid jet recording apparatus which can preferably maintain a recording quality irrespective of a change in ambient temperature but does not cause the apparatus to become large and the price to be raised and the like, and in which the recording time does not become unnecessarily longer under the conditions at ordinary to high temperatures.

Still another object of the present invention is to provide a liquid jet recording apparatus which can automatically realize the recording speed according to ambient temperature, thereby enabling the recording with high quality to be always obtained irrespective of a change in ambient temperature.

Under these objects, an embodiment of the present invention embodying an aspect of the invention comprises: liquid jet recording means for recording by jetting the above-mentioned recording liquids; temperature detecting means for detecting ambient temperature; and control means for controlling the recording speed of the recording means in accordance with the ambient temperature detected by the temperature detecting means.

More practically, the control means can be constituted, as one embodiment, in such a manner as to change the time interval in dependence upon the foregoing ambient temperature when the recording liquids are jetted from the liquid jet recording means.

In this case, as shown in the embodiment, when the liquid jet recording means is arranged so that it can be moved respectively to a plurality of predetermined recording positions so as to perform the recording by jetting individually the recording liquids for the surface to be recorded at each of those plurality of predetermined recording positions, the above-mentioned control means can be constituted so as to control the traveling speed of the recording means according to the ambient temperature.

In addition, as shown in the embodiment, the foregoing control of the recording speed of the liquid jet recording means depending upon the ambient temperature by the control means may be performed step by step or continuously.

Therefore, according to the present invention, since the recording speed is controlled in dependence upon ambient temperature, considerable advantages can be derived such that good recording with high quality can be always performed without unnecessarily making the recording time long even at any temperature within the operative temperature range of the apparatus, and that a cheaper and smaller liquid jet recording apparatus can be constituted as compared with the apparatus using temperature compensating means by a heater or the like, etc.

Further other objects and features of the present invention will be apparent from the following detailed description in conjunction with the accompanying drawings.

In addition, signals to be recorded in the invention may be character signals or image signals. In this specification, both signals are represented by a term of recording signal(s). Therefore, the recording denotes the recording of characters and/or picture images.

Furthermore, as an embodiment of the present invention, there is shown hereinbelow an example in the case where the invention was applied to a liquid jet recording apparatus using a piezo element which is an example of electrical-mechanical converting elements serving as an energy source to jet and emit the recording liquids. However, such an energy source may be for example means for jetting and emitting necessary quantities of recording liquids by way of generation of air bubbles. Therefore, obviously the present invention is not limited to only the constitution shown in the embodiment but the invention can be broadly applied to any liquid jet recording apparatus as set forth in the beginning which can record by jetting and emitting the recording liquids whose physical property values vary depending upon ambient temperature.

BRIEF DESCRIPTION OF THE DRAWINGS

A preferred embodiment of the present invention will be described hereinbelow with reference to the accompanying drawings, in which.

DESCRIPTION OF THE PREFERRED EMBODIMENT

Figure 1:
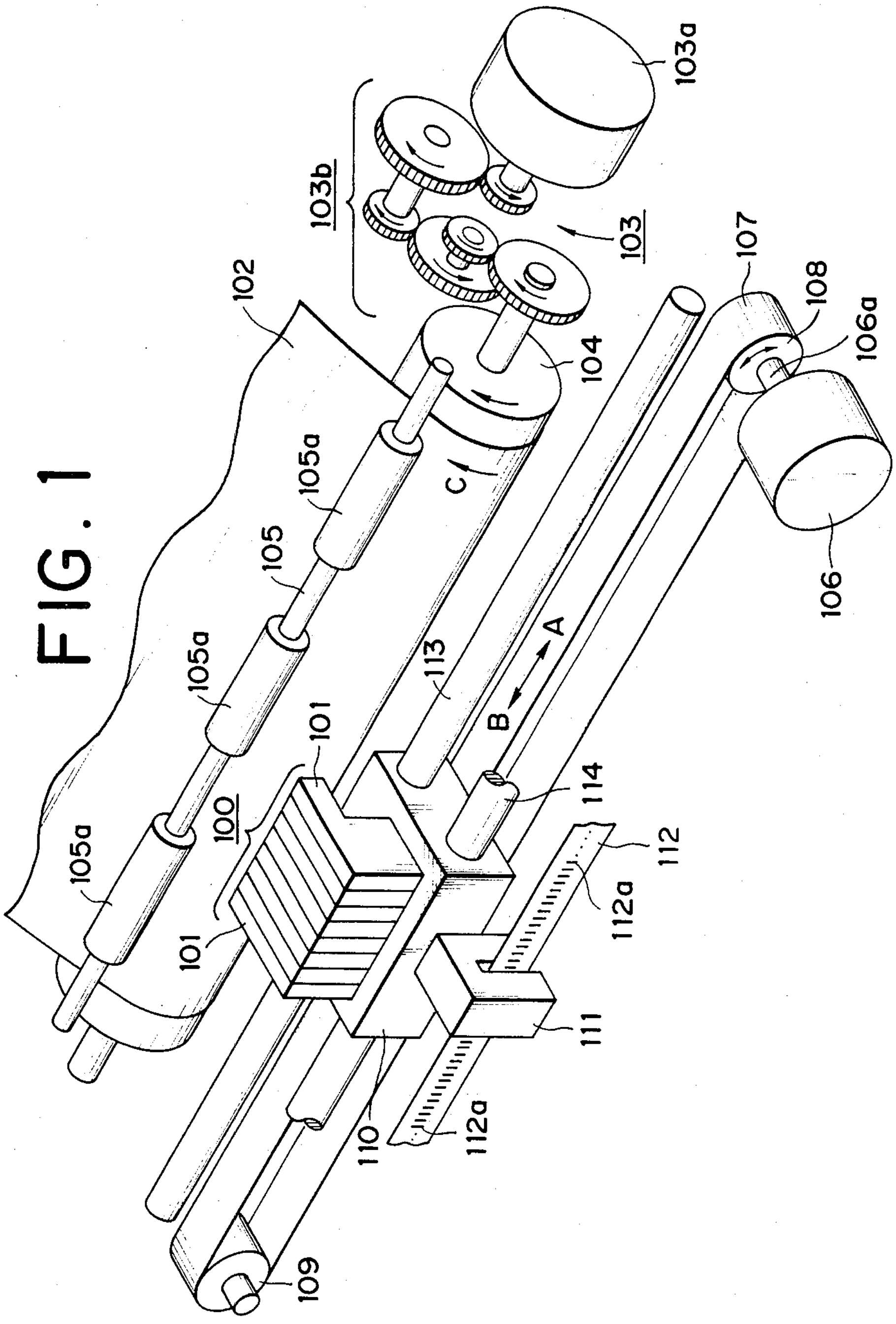
FIG. 1 is a perspective view illustrating the principal sections of the ink jet head traveling mechanism and paper feed mechanism in an example of an ink jet recording apparatus to which the present invention can be applied.

Referring now to FIG. 1, there will be described an ink jet head traveling mechanism and a paper feed mechanism in an example of an ink jet recording apparatus to which the present invention can be applied.

In the illustration, a reference numeral 100 denotes an ink jet head assembly incorporating at least one ink jet head unit 101. Although an array of eight head units 101 are included in the example shown, the number of head units 101 is not essential in particular. The constitution of the head unit 101 will be described in detail later with reference to FIGS. 3A and 3B. The head assembly 100 is supported by a head carriage 110, while the carriage 110 can be reciprocated in the directions as indicated by arrows A and B in FIG. 1 by being guided along two parallel guide rods 113 and 114 fixedly arranged. A numeral 106 denotes a head traveling motor as head traveling means and a belt 107 is put between a first pulley 108 attached to an output shaft 106*a* of the motor 106 and a second pulley 109 which is rotatably disposed at a position apart by a predetermined distance from this first pulley 108 along the guide rods 113 and 114. The carriage 110 is coupled to a part of this belt 107. Therefore, when the output shaft 106*a* of the motor 106 rotates forwardly or reversely, the belt 107 is reciprocated in the directions indicated by the arrows A and B in association with the rotation of the motor, so that the carriage 110 is reciprocated along the guide rods 113 and 114 in the directions of the arrows A and B. Therefore, this causes the recording position of the head assembly 100 for a recording paper 102 which is a recording carrier to be changed.

A numeral 112 represents a fixedly disposed linear position encoder plate having a plurality of marks 112*a* to indicate the recording positions, i.e., the ink emitting positions by the head assembly 100; and 111 denotes an emitting position detector to detect the marks 112*a* on this encoder plate 112. This detector 111 is fixed to a portion of the carriage 110 and is movable together with the carriage 110. Since the practical constitution of the position detector 111 is well known, its detailed illustration is omitted in FIG. 1. However, in the case where the marks 112*a* on the encoder plate 112 are, for instance, the marks written by black on a transparent film or the marks formed as translucent slits on a non-translucent plate, the detector 111 is constituted in the manner such that it includes a photo coupler and photo interrupter consisting of a combination of light emitting elements and photo-sensing element which are positioned and arranged in the relation so as to sandwich this encoder plate 112 and that a pulsate signal to indicate the emission of inks is output whenever the marks 112*a* are detected.

In addition, it is obviously possible to constitute in the manner such that the detector 111 is fixedly disposed and the encoder plate 112 is moved along with the carriage 110 in place of the above constitution whereby the encoder plate 112 is fixed and the detector 111 is movable.

A reference numeral 103 denotes a paper feed mechanism including a paper feeding pulse motor 103*a* and gear train 103*b;* 104 is a paper feeding drum; and 105*a* indicates paper pressing rollers supported rotatably by an axis 105. The recording paper 102 is sandwiched by the paper feeding drum 104 and the paper pressing rollers 105*a* and in this state, the rotation of the pulse motor 103a is transferred through the gear train 103b to the paper feeding drum 104, so that the drum 104 is rotated in the direction indicated by an arrow in the drawing, thereby allowing the recording paper 102 to be sent in the direction indicated by an arrow C.

A control system of the ink jet recording apparatus having the constitution described above will then be described with reference to FIG. 2.

In the diagram a numeral 201 indicates a head drive-circuit for permitting the emission of inks to be performed by driving the individual head units 101 in the head assembly 100. In this embodiment, the head-drive circuit 201 selectively drives the head units 101 in response to recording signals which are being input at that time in response to an emitting position detection pulse from the emitting position detector 111.

A numeral 202 denotes a motor-control circuit for controlling the head traveling motor 106 through a motor-drive circuit 204; and 203a and 203b are an A-direction limit switch and a B-direction limit switch adapted to be closed by, for example, a part of the head carriage 110 when it reaches the respective end positions of the movements in the directions indicated by the arrows A and B, respectively. The motor-control circuit 202 controls the rotation of the motor 106 in the manner such that, for example, it switches the rotation of the motor 106 from the forward rotation to the reverse rotation in response to the turn-on of the A-direction limit switch 203a, while it switches from the reverse rotation to the forward rotation in response to the turn-on of the B-direction limit switch 203b and that its rotating speed becomes constant during its rotation.

In the ink jet recording apparatus having the constitution as described above, whenever the emitting positions are detected by the emitting position detector 111 in the process in that the head carriage 110 is moved at a constant speed by the motor 106, the head units 101 in the head assembly 100 are selectively driven by the head-drive circuit 201 at that time in response to the recording signals which are being input thereto, thereby performing the recording by ink emission. In this case, assuming that a moving speed of the head carriage 110, namely, of the head assembly 100 is v (mm/sec) and a pitch of the marks 112a on the encoder plate 112, i.e., a pitch of the emitting positions is p (mm), the emitting frequency of inks by the head assembly 100 (or head units 101) becomes v/p (Hz) and the emitting time interval becomes p/v (sec). As will be described later, in the case where it takes a certain time to refill the ink for the next ink emission after each head unit 101 has once emitted the ink, namely, where it takes an ink refilling time t (sec), it is necessary to set the foregoing emitting time interval p/v to be not shorter than the refilling time t in order to assure the recording quality.

In addition, in the apparatus constituted as described above, the recording may be performed only in the traveling process of the head carriage 110 in the direction indicated by the arrow A in FIG. 1, or the recording may be done in both traveling processes in the direction of the arrows A and B. In the former case, when the carriage 110 reached the end position in the A direction and is returned subsequently in the B direction, the recording paper 102 may be sent by a predetermined length in the direction indicated by the arrow C by making the paper feeding pulse motor 103a operative. On one hand, in the latter case, the recording paper 102 may be sent by a predetermined length at a time in the C direction by making the pulse motor 103a operative whenever the carriage 110 reaches the respective end positions in the A and B directions.

Figures 3A, 3B:
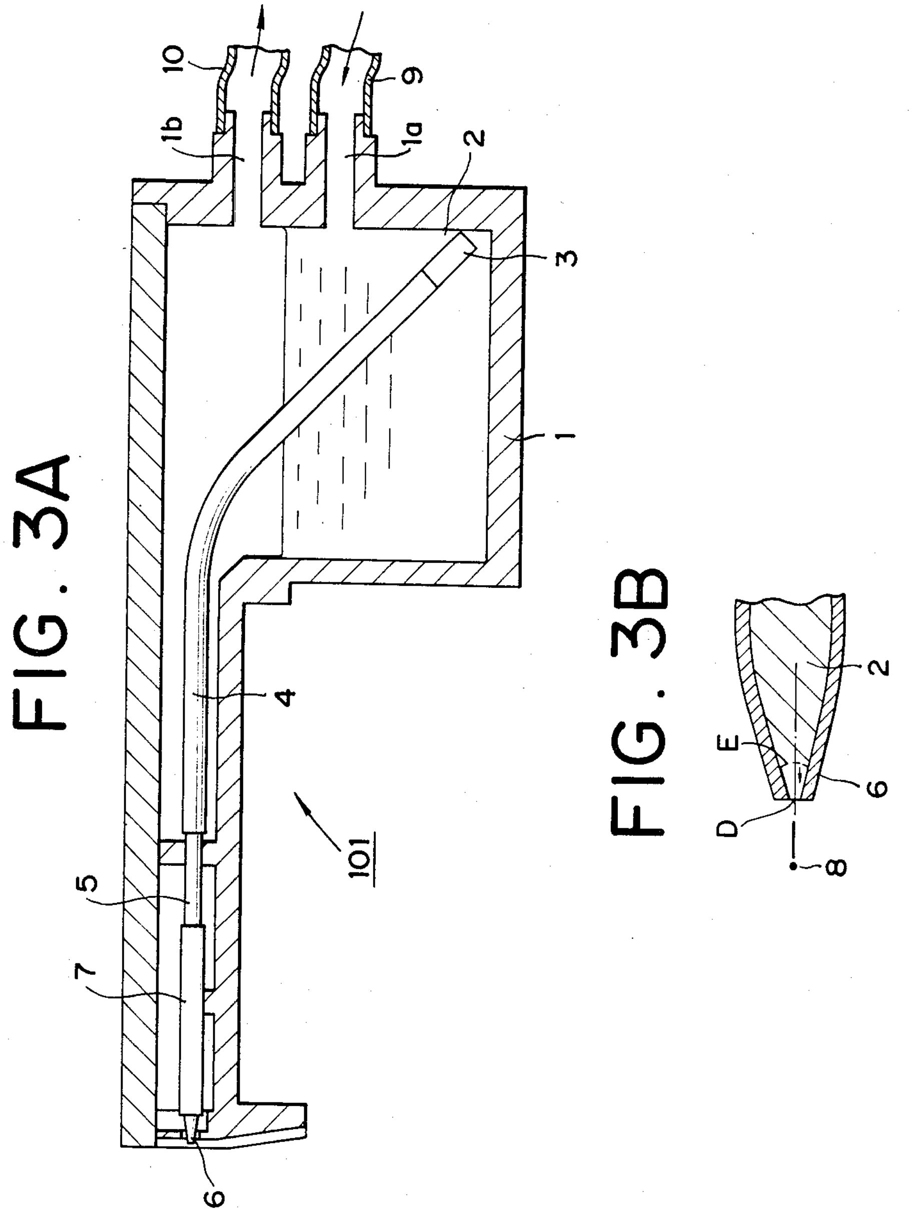
FIG. 3A is an enlarged cross sectional view illustrating one ink jet head unit in the apparatus of FIG. 1.
FIG. 3B is an enlarged cross sectional view showing an orifice portion in FIG. 3.

The above-described ink jet head units 101 have the constitution as illustrated in FIG. 3A and FIG. 3B, respectively.

In the illustration, a reference numeral 1 denotes an ink subtank and an ink 2 as a recording liquid is supplied from a main ink tank (not shown) to the subtank 1 through an ink supply pipe 9 connected to its ink intake port 1a. At time when an ink 2 is supplied, the overflow ink is drained through an overflow ink exhaust port 1b and an overflow ink exhaust pipe 10 connected threrto. A numeral 3 denotes a filter; 4 is an ink supply tube; and 5 is a glass tube and an ink emitting orifice 6 is provided at its one end. A numeral 7 represents a cylindrical piezo element which is an example of electrical-mechanical converting elements serving as an ink emitting energy source. When this piezo element 7 is shrunk by applying the voltage supplied by the head-drive circuit 201 in FIG. 2 responsive to the recording signal thereto a part of the glass tube 5 is shrunk, so that one or more ink droplets 8 is (are) emitted from the orifice 6 as shown in FIG. 3B. The ink emission is ended when the voltage supply is shut off and then the surface of the ink 2 in the glass tube 5 is returned backward from the position of the head D of the orifice 6 to the position indicated by E as shown in FIG. 3B. Then, the surface of the ink 2 moves from the position indicated by E to the position indicated by D due to surface tension and at this time, the ink 2 is refilled into the glass tube 5 through the filter 3 and ink supply tube 4. The time t required for this series of operations is the refilling time.

In the case where the shrinkage of the piezo element 7 is repeated at a time interval of not shorter than the foregoing refilling time t, a quantity of ink emission corresponds to a displacement amount of the piezo element 7 with an appropriate relation, thereby enabling a proper quantity of ink to be always emitted.

On the contrary, in the case where the piezo element 7 is shrunk at a time interval shorter than the refilling time t, since the next ink emission is done in the state in that the surface of the ink 2 is not completely returned to the position indicated by D in FIG. 3B, it is impossible to emit a suitable quantity of ink, so that this causes the recording quality to deteriorate.

Figure 4:
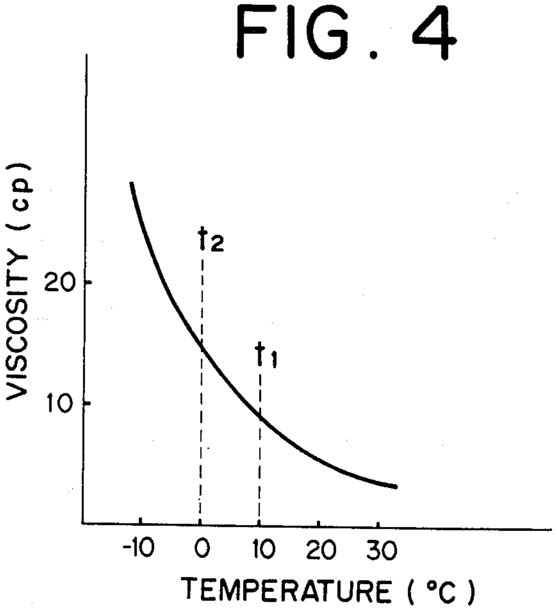
FIG. 4 is a graph showing the relationship between the temperature and the viscosity of ink.

On the other hand, this refilling time t largely depends upon the physical property values of the surface tension and viscosity and the like of an ink. This characteristics will be described with respect to FIG. 4. FIG. 4 shows the change characteristics of viscosity in association with a change in temperature, in which an axis of abscissa indicates a temperature (°C.) and an axis of ordinate represents a viscosity (cp). For example, when the temperature decreases from 10° C. to 0° C., the refilling time t of an ink in the ink jet head changes from $t_1$ to $t_2$ ($>t_1$) due to a decrease in fluidity of the ink due to an increase in viscosity.

Therefore, in order to always assure the recording with high quality irrespective of a temperature change within an operating temperature range of the ink jet recording apparatus, for example there have been considered the following methods:

(1) to preset the ink emitting frequency in accordance with an ink refilling time $t_{max}$ at the lowest temperature to be presumed;

(2) to keep the ink temperature at constant by way of a heating apparatus such as a heater or the like, and the like.

However, the former method (1) has a drawback such that the recording time becomes unnecessarily long at ordinary to high temperatures, while the latter method (2) has a drawback such that it causes the cost and dimensions of the ink jet apparatus to be increased.

The present invention intends to dissolve such inconveniences and will be described hereinbelow with respect to its embodiment.

Figure 5:
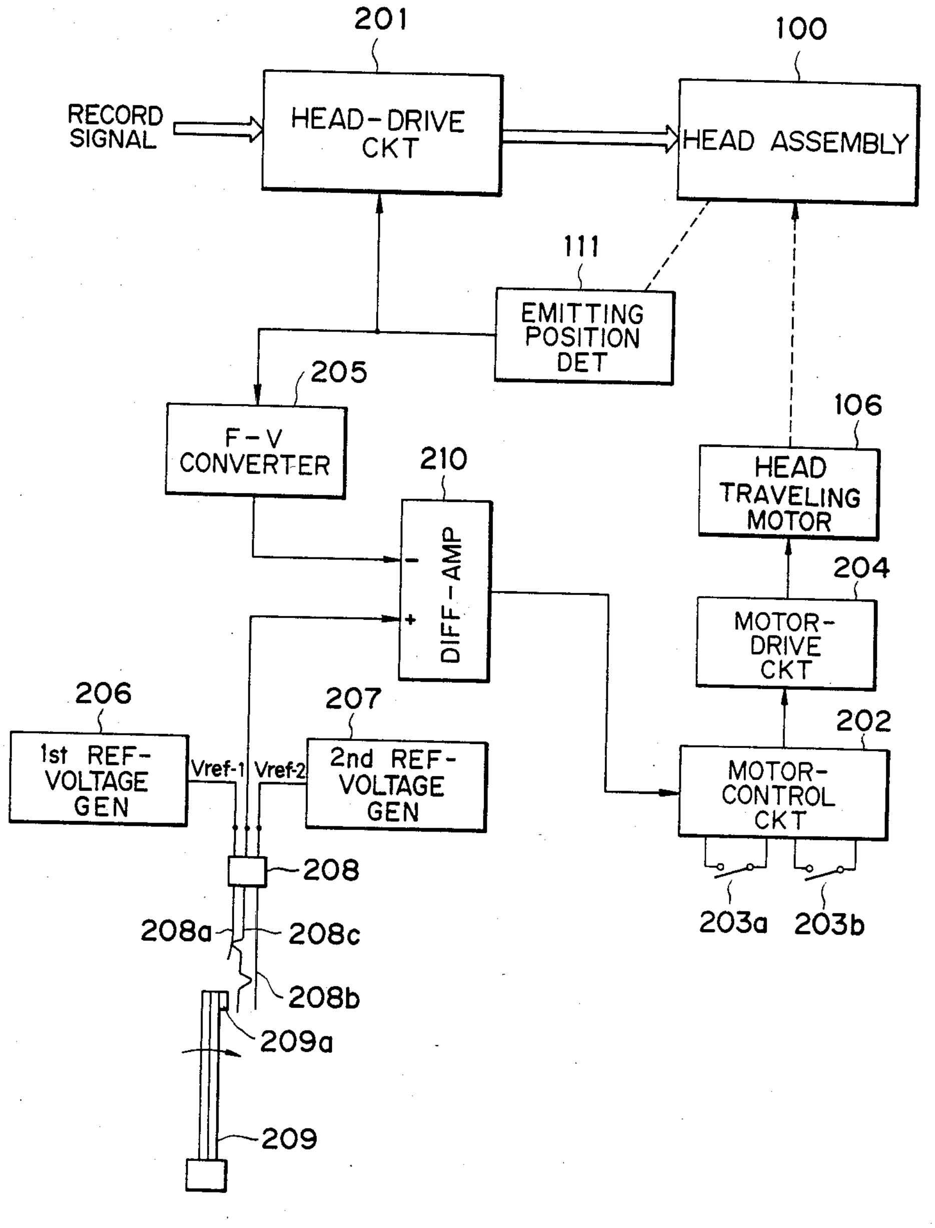
FIG. 5 is a block diagram showing an example of the control system in the case where the present invention was applied to the ink jet recording apparatus as mentioned in FIGS. 1, 2, 3A and 3B as one embodiment of the invention.

FIG. 5 shows a control system, in particular, of one embodiment in the case where the present invention was applied to the ink jet recording apparatus such as described with respect to FIGS. 1, 2, 3A and 3B. In the diagram, the elements and components having the similar constitutions and functions as those of the elements and components that have been already mentioned are designated by the same reference numerals as those in FIGS. 1 and 2.

A reference numeral 205 denotes an F-V converter which receives a detection pulse from the emitting position detector 111 and outputs a voltage corresponding to its frequency, and its output is applied to an inverting input of a differential amplifier 210. A numeral 206 indicates a first reference voltage generator for generating a first reference voltage $V_{ref.1}$ to specify the head traveling speed which is suitable for recording at temperatures of not lower than a predetermined temperature $T_n$ (°C.); 207 is a second reference voltage generator for generating a second reference voltage $V_{ref.2}$ to specify the head traveling speed which is suitable for recording at temperatures lower than the above-mentioned predetermined temperature $T_n$; and 208 is a switch for allowing outputs of these reference voltage generators 206 and 207 to be selectively supplied to a non-inverting input of the differential amplifier 210. This switch 208 has two fixed armatures 208a and 208b and one movable armature 208c which is arranged therebetween and has a self-closing nature for the fixed armature 208a. The fixed armatures 208a and 208b are connected to outputs of the reference voltage generators 206 and 207, respectively, while the movable armature 208c is connected to the non-inverting input of the differential amplifier 210. A numeral 209 denotes a bimetal serving as a temperature detector. This bimetal 209 is arranged for the switch 208 in such a manner that in the case where the ambient temperature is not lower than the foregoing predetermined temperature, this bimetal 209 does not act on the switch 208 at all, while in the case where the ambient temperature becomes lower than this predetermined temperature, it acts so that the movable armature 208c of the switch 208 is switched from the side of the fixed armature 208a to the side of the fixed armature 208b by means of an insulative switch operating portion 209a at the edge of the switch 209 due to deformation in the direction indicated by an arrow in FIG. 5. In addition, it is preferable to dispose the bimetal 209 near the head assembly 100 as close as possible, but it is not necessarily disposed on the head carriage 110 and may be fixedly arranged near the recording stage.

The output of the differential amplifier 210 is applied to the motor-control circuit 202. In response to the output of this differential amplifier 210, the motor-control circuit 202 allows the motor 106 to be accelerated when the output is positive, while it permits the motor to be decelerated when the output is negative, thereby controlling the motor 106 through the motor-drive circuit 204 so that the output of the differential amplifier 210 always approaches zero.

The foregoing first and second reference voltages $V_{ref.1}$ and $V_{ref.2}$ are determined in the manner as will be described below. Namely, it is assumed that when the ambient temperature is the predetermined temperature $T_n$ (°C.), $t_n$ (sec) is needed as the ink refilling time t due to the physical property values of the ink 2, and that in the case where the ambient temperature is the lowest temperature to be presumed (lowest temperature within the operating temperature range of the apparatus) $T_{min}$ (°C.) ($T_{min} < T_n$), $t_{max}$ (sec) ($t_{max} > t_n$) is needed as the ink refilling time t due to the physical property values of the ink 2. Furthermore, it is assumed that p and v are the pitch of the marks 112a on the encoder plate 112 and the traveling speed of the head assembly 100 as already mentioned before, respectively. Under these conditions, the first reference voltage $V_{ref.1}$ is the voltage value so as to provide $v = v_1 \leqq p/t_n$ at the head traveling speed of v, while the second reference voltage $V_{ref.2}$ is the voltage value so as to provide $v = v_2 \leqq p/t_{max}$ (wherein, $v_1 > v_2$).

In this way, in the present embodiment, in the case where the ambient temperature is not lower than the predetermined temperature $T_n$, since the movable armature 208c of the switch 208 is in contact with the fixed armature 208a, the first reference voltage $V_{ref.1}$ from the first reference voltage generator 206 is selected as the non-inverting input of the differential amplifier 210. Due to this, the head traveling speed v is controlled to the foregoing $v_1$ through the control of the head traveling motor 106 by the motor-control circuit 204 responsive to the output of the differential amplifier 210. In addition, the ink emitting frequency in this case, i.e., the recording frequency becomes $v_1/p$ (Hz).

On the contrary, when the ambient temperature becomes lower than the predetermined temperature $T_n$, since the movable armature 208c of the switch 208 is switched from the fixed armature 208a to the fixed armature 208b by the bimetal 209, the second reference voltage $V_{ref.2}$ from the second reference voltage generator 207 is then selected as the non-inverting input of the differential amplifier 210. Thus the head traveling speed v is controlled to the foregoing $v_2$. Also, the ink emitting frequency at this time, i.e., the recording frequency becomes $v_2/p$ ($H_z$).

A modification for the control system shown in FIG. 5 will then be described as another embodiment of the present invention.

Figure 6:
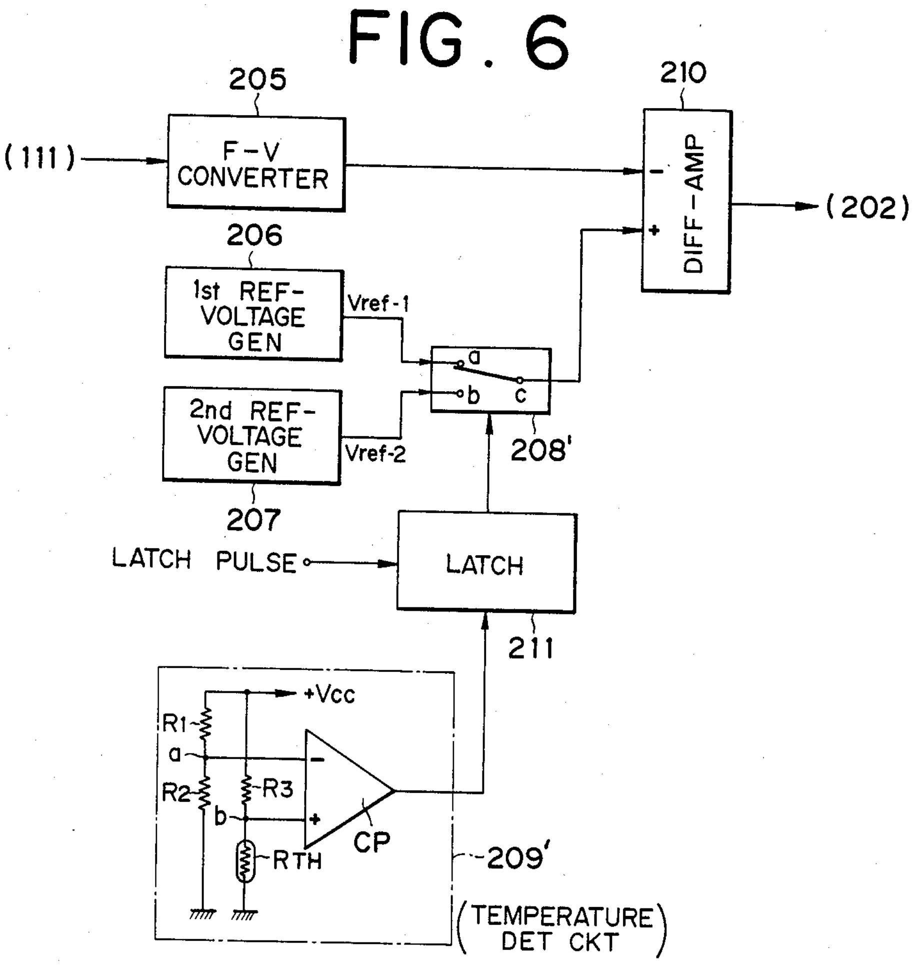
FIGS. 6 and 7 are block diagrams showing the constitutions of the principal sections in other two examples of the foregoing control system.

FIG. 6 shows an example in the case where a temperature detecting circuit including a thermal sensor is used in place of the bimetal 209 in FIG. 5. In the diagram, the elements and components having the similar constitutions and functions as those of the elements and components which have been already mentioned before are designated by the same reference numerals as those shown in FIGS. 1, 2 and 5; on the other hand, the corresponding elements are designated by the same reference numerals except that they are written together with dashes.

In FIG. 6, a reference numeral 209' denotes a temperature detecting circuit in place of the bimetal 209 in FIG. 5. This circuit 209' includes: a series circuit of resistors $R_1$ and $R_2$ respectively arranged between a power supply $+V_{cc}$ and a circuit ground; a series circuit of a resistor $R_3$ and a thermister $R_{TH}$ as an example of resistor elements of the thermally sensitive type; and a voltage comparator CP connected so as to receive at its inverting input a potential at a node a between the resistors $R_1$ and $R_2$ and to receive at its non-inverting input a potential at a node b between the resistor $R_3$ and the thermister $R_{TH}$. The thermister $R_{TH}$ is the element having the characteristics such that its resistance value becomes large with a decrease in ambient temperature as is well known. Each resistance value of the resistors $R_1$, $R_2$ and $R_3$ is selected so that in the case where the ambient temperature is not lower than the foregoing predetermined temperature $T_n$, the potential at the node a is not lower than the potential at the node b, while in the case where the ambient temperature becomes lower than the predetermined temperature $T_n$, the potential at the node b is higher than the potential at the node a. Therefore, when the ambient temperature is not lower than $T_n$, an output of the comparator CP as an output of the temperature detecting circuit 209' is low, but when the ambient temperature becomes lower than $T_n$, the output becomes high.

Figure 2:
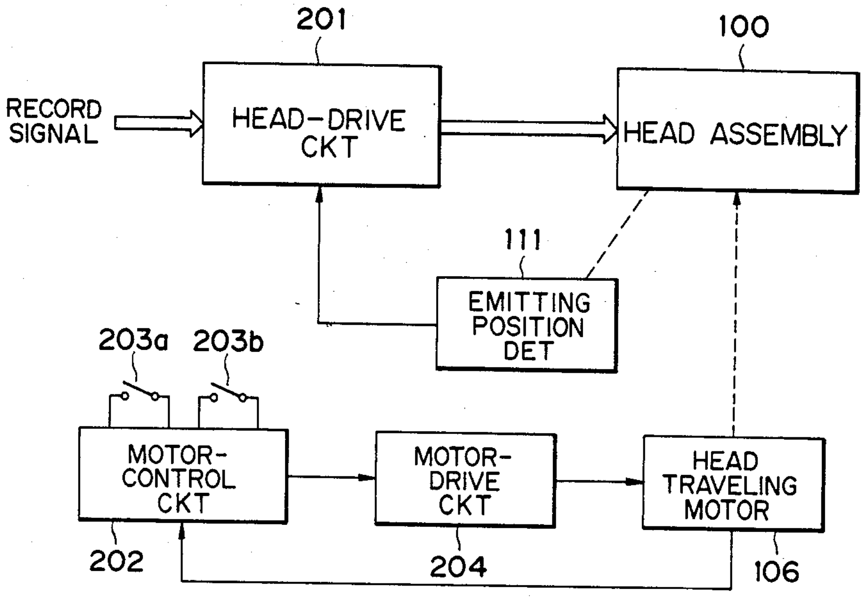
FIG. 2 is a circuit block diagram showing the outline of a control system of the ink jet recording apparatus having the constitution of FIG. 1.

A numeral 211 denotes a latch circuit and, for example, in response to the latch pulse to be output from means (not shown) in association with the turn-on of the limit switches 203*a* and 203*b* which have been described in FIG. 2, this latch circuit 211 latches the output of the temperature detecting circuit 209' at that time. A numeral 208' is a switching circuit in place of the switch 208 in FIG. 5 and an output of the latch circuit 211 is supplied as a control input to this switching circuit 208'. When the output of the latch circuit 211 is low, the circuit 208' connects an output c to an input a, while when the output is high, it connects the output c to an input b. In this switching circuit 208', its input a is connected to the output of the first reference voltage generator 206, its input b is connected to the output of the second reference voltage generator 207, and its output c is connected to the non-inverting input of the differential amplifier 210.

Therefore, in the constitution of the present embodiment, in the case where the ambient temperature is not lower than $T_n$, since the output of the temperature detecting circuit 209' is low, the first reference voltage $V_{ref.1}$ from the first reference voltage generator 206 is applied to the non-inverting input of the differential amplifier 210 by the switching circuit 208', so that the head traveling speed v is set into $v_1$ mentioned before. On the other hand, when the ambient temperature becomes lower than $T_n$, since the output of the temperature detecting circuit 209' becomes high, the second reference voltage $V_{ref.2}$ from the second reference voltage generator 207 is applied to the non-inverting input of the differential amplifier 210 by the switching circuit 208', so that the head traveling speed v is set into $v_2$ mentioned before.

In addition, in this embodiment, since the output of the temperature detecting circuit 209' is latched by the latch circuit 211, the change-over of the head traveling speed v during the recording of one line is prevented, so that a random variation of the recording dot interval in one line is prevented.

In any embodiment shown in FIGS. 5 and 6, the head traveling speed v is switched to two steps of high ($v_1$) and low ($v_2$) in dependence upon the ambient temperature; however, it is obvious that the number of steps of the speed control is not limited to two but may be set into further more steps.

Figure 7:
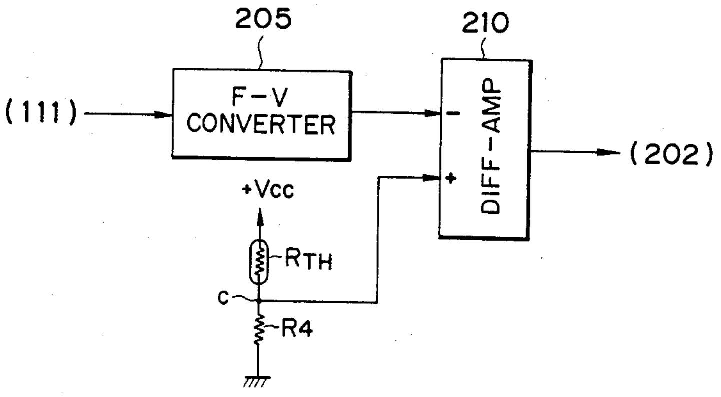

Otherwise, the speed control may be continuously performed as shown in an example in FIG. 7. Namely, in the diagram, the thermister $R_{TH}$ together with a resistor $r_4$ constitutes a series circuit and is provided between the power supply $+V_{cc}$ and the circuit ground, and the potential at the node c is applied to the non-inverting input of the differential amplifier 210.

According to such a constitution, since the potential at the node c decreases with a decrease in ambient temperature, the head traveling speed v is also reduced, thereby allowing the speed control in this case to be performed continuously.

Furthermore, in order to prevent the random variation of the recording dot interval in one line, a sample and hold circuit (analog latch circuit) corresponding to the latch circuit 211 in FIG. 6 may be arranged between the node c and the non-inverting input of the differential amplifier 210 or between the output of the differential amplifier 210 and the input of the motor-control circuit 202.

What we claim is:

1. A liquid jet recording apparatus using recording liquid having physical properties depending upon an ambient temperature, comprising:

(A) liquid jet recording means having a controllable recording speed for recording by jetting said recording liquids;

(B) temperature detecting means for detecting said ambient temperature; and (C) control means for controlling the recording speed of said recording means in accordance with the ambient temperature detected by said temperature detecting means.

2. An apparatus according to claim 1, wherein said liquid jet recording means includes:

liquid jet means for jetting said recording liquids; and drive means having a controllable driving speed for driving said jet means in response to a signal to be recorded;

said control means being arranged so as to control the driving speed of said drive means in accordance with the ambient temperature detected by said temperature detecting means.

3. An apparatus according to claim 2, further comprising ;

traveling means for traveling said liquid jet means to a surface to be recorded;

wherein said drive means includes:

jet position indicating member to indicate a plurality of predetermined positions for the jet of said recording liquids by said jet means;

a detector to detect each jet position to be indicated by said indicating member;

one of said indicating member and said detector being movable for the other with regard to the movement of said jet means; and a drive circuit which can respond to said detector and drives said jet means in response to said signal to be recorded whenever said detector detects the jet position to be indicated by said indicating member;

and wherein said control means is arranged so as to control the traveling speed of said jet means by said traveling means in accordance with the ambient temperature detected by said temperature detecting means.

4. An apparatus according to claim 3, wherein said detector is movable together with said jet means for said indicating member.

5. An apparatus according to claim 3, wherein said control means is arranged so as to switch the traveling speed of said jet means by said traveling means between at least two mutually different speeds in accordance with the ambient temperature detected by said temperature detecting means.

6. An apparatus according to claim 2, wherein said drive means is arranged so as to intermittently drive said jet means at the controllable driving frequency in response to said signal to be recorded; and wherein said control means is arranged so as to control the driving frequency of said drive means in accordance with the ambient temperature detected by said temperature detecting means.

7. An apparatus according to claim 6, wherein said control means is arranged so as to switch the driving frequency of said drive means between at least two mutually different frequencies in accordance with the ambient temperature detected by said temperature detecting means.

8. An apparatus according to claim 2, wherein said control means is arranged so as to switch the driving speed of said drive means between at least two mutually different speeds in accordance with the ambient temperature detected by said temperature detecting means.

9. An apparatus according to claim 1, wherein said recording means is arranged so as to record by intermittently jetting said recording liquids at the controllable recording frequency; and wherein said control means is arranged so as to control the recording frequency of said recording means in accordance with the ambient temperature detected by said temperature detecting means.

10. An apparatus according to claim 9, wherein said control means is arranged so as to switch the recording frequency of said recording means between at least two mutually different frequencies in accordance with the ambient temperature detected by said temperature detecting means.

11. An apparatus according to claim 1, wherein said control means is arranged so as to switch the recording speed of said recording means between at least two mutually different speeds in accordance with the ambient temperature detected by said temperature detecting means.

12. An apparatus according to claim 1, wherein said control means is arranged so as to reduce the recording speed of said recording means in association with a decrease in said ambient temperature.

13. An ink jet recording apparatus using ink liquids having viscosities depending upon an ambient temperature comprising:

(A) at least one ink jet head for emitting at least one ink droplet for the driving of one time;

(B) drive means for repeatedly driving said head; and (C) control means for controlling the frequency of the repetitive driving of said head by said drive means in accordance with said ambient temperature.

14. An apparatus according to claim 13, wherein said control means is arranged so as to switch the driving frequency of said head by said drive means between at least two mutually different frequencies in accordance with said ambient temperature.

15. An apparatus according to claim 13, wherein said control means is arranged so as to reduce the driving frequency of said head by said drive means in association with a decrease in said ambient temperature.

16. An ink jet recording apparatus using ink liquids having viscosities depending upon an ambient temperature comprising:

(A) at least one ink jet head for emitting at least one ink droplet for the driving of one time;

(B) traveling means for traveling said head;

(C) drive means for repeatedly driving said head at a time interval corresponding to the traveling speed of said head; and (D) control means for controlling the traveling speed of said head by said traveling means in accordance with said ambient temperature.

17. An apparatus according to claim 16, wherein said control means is arranged so as to switch the traveling speed of said head by said traveling means between at least two mutually different speeds in accordance with said ambient temperature.

18. An apparatus according to claim 16, wherein said control means is arranged so as to reduce the traveling speed of said head by said traveling means in association with a decrease in said ambient temperature.

* * * * *

UNITED STATES PATENT AND TRADEMARK OFFICE
CERTIFICATE OF CORRECTION

PATENT NO. : 4,544,931

DATED : October 1, 1985

INVENTOR(S) : YOSHITAKA WATANABE, ET AL.

It is certified that error appears in the above-identified patent and that said Letters Patent is hereby corrected as shown below:

On cover page insert

--[30] Foreign Application Priority Data

April 22, 1983 [JP] Japan 58-71117--.

Column 1, line 31, delete "the";
line 32, change "types" to --type-- and change "keep" to --maintain--;
line 46, change "using" to --causing--; and
line 49, change "not" to --no--.

Column 2, line 14, change "one" to --the other--.

Column 3, line 21, change "a" to --the-- and delete "of";
line 35, change "constitution" to --configuration--;
lines 66-67, change "constitutions" to --configurations--; and
line 67, change "other two" to --two other--.

Column 4, line 20, change "is put" to --runs--;

UNITED STATES PATENT AND TRADEMARK OFFICE

CERTIFICATE OF CORRECTION

PATENT NO. : 4,544,931

DATED : October 1, 1985

INVENTOR(S) : YOSHITAKA WATANABE, ET AL.

It is certified that error appears in the above-identified patent and that said Letters Patent is hereby corrected as shown below:

Column 4, line 38, change "by" to --of--;
line 42, change "constitution" to --construction--;
line 46, change "by" to --in--; and
lines 48-49, delete "in the manner".

Column 5, lines 33-34, change "constitution" to --construction--; and
line 66, change "one" to --the other--.

Column 6, lines 4-5, delete ", respectively";
line 12, change "threrto" to --thereto--
line 21, insert --,-- after "thereto";
lines 41-42, change "in that" to --when--;
line 48, change "This" to --These--;
line 66, delete "at"; and
lines 67-68, delete ", and the like".

Column 7, line 6, change "dissolve" to --eliminate--; and
line 14, change "constitutions" to --configurations--.

UNITED STATES PATENT AND TRADEMARK OFFICE
CERTIFICATE OF CORRECTION

PATENT NO. : 4,544,931

DATED : October 1, 1985

INVENTOR(S) : YOSHITAKA WATANABE, ET AL.

It is certified that error appears in the above-identified patent and that said Letters Patent is hereby corrected as shown below:

Column 8, line 46, change "then" to --now--;
lines 51-52, change "constitutions" to --configurations--; and
lines 57-58, change "together with dashes." to --as "primes".--.

Column 9, line 36, delete "constitution of the";
line 43, change "into" to --at--;
line 50, change "into" to --at--;
line 67, change "$r_4$" to --$R_4$--.

Signed and Sealed this

*Twenty-sixth* Day of *August 1986*

[SEAL]

*Attest:*

DONALD J. QUIGG

*Attesting Officer* *Commissioner of Patents and Trademarks*